United States Patent [19]
Gustin et al.

[11] Patent Number: 4,883,511
[45] Date of Patent: Nov. 28, 1989

[54] LAMINAR FLOW MULTIPLANE MATRIX CEILING SYSTEM

[76] Inventors: Arnold Gustin; Kevin McGillivray, both of 28210 Crocker Ave., Suite 301, Valencia, Calif. 91355

[21] Appl. No.: 173,316

[22] Filed: Mar. 25, 1988

[51] Int. Cl.⁴ .............................................. B01D 46/00
[52] U.S. Cl. ..................... 55/355; 55/385.2; 55/484; 55/495; 55/508
[58] Field of Search ............. 55/355, 385.2, 484, 55/492, 495, 508; 98/31.5, 33.1, 34.5, 40.8

[56] References Cited

U.S. PATENT DOCUMENTS

| | | | |
|---|---|---|---|
| 4,049,406 | 9/1977 | Rivels | 55/484 |
| 4,461,205 | 7/1984 | Shuler | 55/484 X |
| 4,545,793 | 10/1985 | Shuler | 55/355 |
| 4,601,737 | 7/1986 | Gerbig | 55/508 X |
| 4,671,811 | 6/1987 | Cadwell et al. | 55/355 |

*Primary Examiner*—Charles Hart
*Attorney, Agent, or Firm*—John E. Wagner

[57] ABSTRACT

A ceiling system for clean rooms is disclosed employing two sets of framed filters, an upper set and a lower set arranged in checkerboard fashion. One set supports the other set and the supporting set is suspended from the overhead or ceiling of the room. A plenum of two height levels is formed. The upper set has depending skirts below the level of its filter medium. The lower set of framed filters include an outer lip or rim which seal the filter sets together at the depending skirts of the upper set. Auxiliary services such as lighting and sprinklers are fed from above the sets of framed filters via the depending skirts of the upper set. In one embodiment, the upper set of framed filters supports the lower set and in an alternate embodiment, the lower set of framed filters supports the upper set. Grid or T bar support systems are eliminated and nearly 100 % filtered laminar flow area is produced.

12 Claims, 4 Drawing Sheets

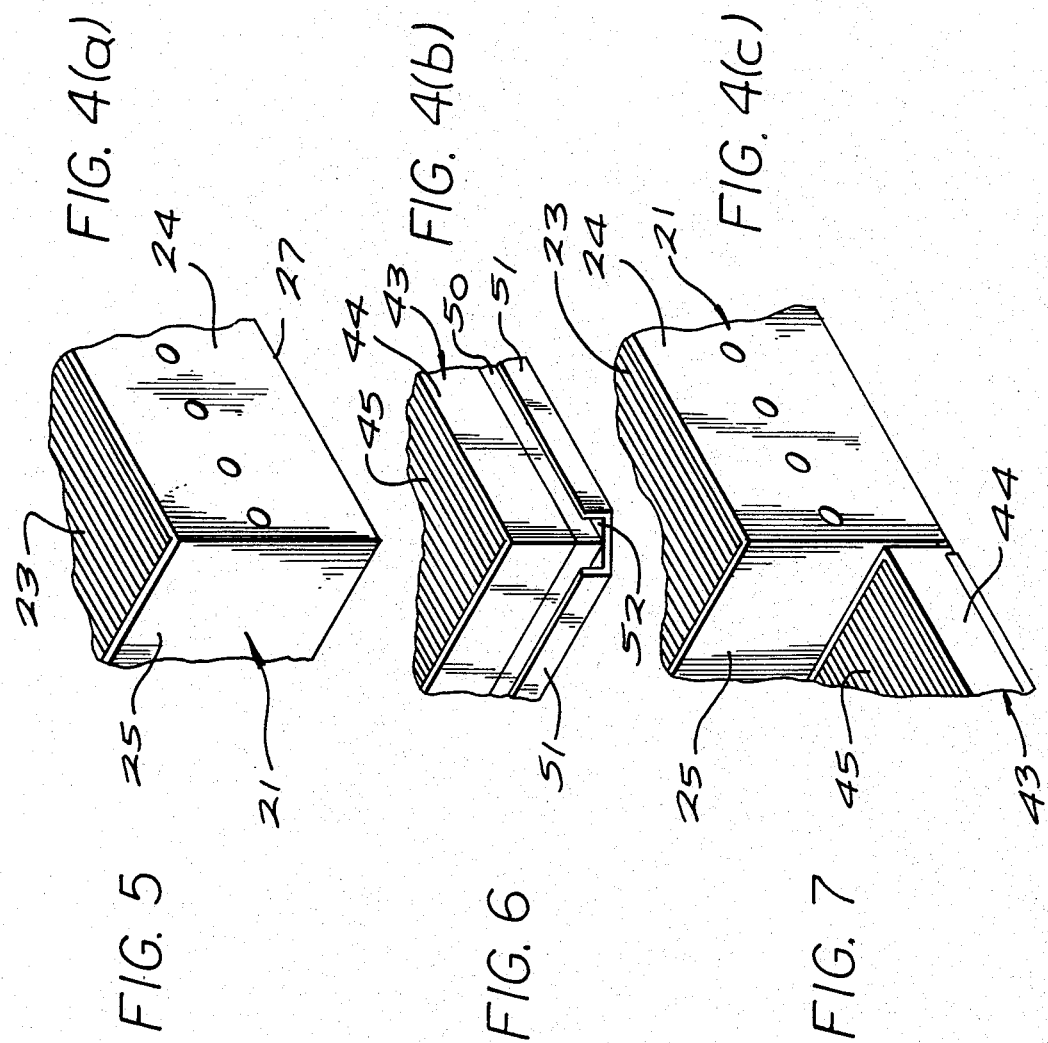
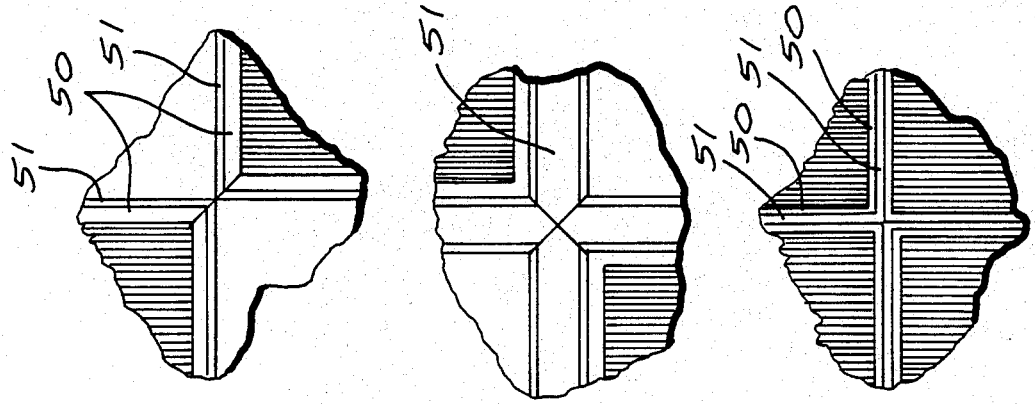

LAMINAR FLOW MULTIPLANE MATRIX CEILING SYSTEM

BACKGROUND OF THE INVENTION

This invention relates to clean room ceilings and more particularly to filter assemblies for clean rooms which provide for near 100% active filter surface of the ceiling and which eliminates the need for conventional ceiling grid support systems.

In recent years, the development of clean rooms has necessarily preceeded the quantity manufacture of precision electronics and aerospace products. In particular, virtually all high technology companies require that precision activities be conducted in a dust or contaminent free clean room, i.e. one with filtered air having laminar flow from the ceiling to lower level returns with all of the air introduced into the ceiling via a plenum area above an array of filters which provide the laminar flow of filtered air.

Characteristically, rather elaborate grid structures have been required to support the filters. The grid structures nor only have the support function which is similar to suspended office type ceiling but the grid systems themselves must have air tight joints to avoid leakage of unfiltered air into the otherwise clean room. Additionally, the grid structure customarily must support auxiliary services such as lighting fixtures and sprinklers. These auxiliary devices and the grid itself present not only air leakage dangers but reduce the overall laminar flow characteristics of the system. Usually a section of filters must be eliminated in order to provide a dummy section in which the auxiliary services such as lighting and sprinklers are installed.

Examples of typical clean room ceiling suspension systems are illustrated in the following patents:

| U.S. Pat. No. | Issue Date | Inventor |
| --- | --- | --- |
| 3,782,082 | Jan. 1, 1974 | Smith et al |
| 3,986,850 | Oct. 19, 1976 | D. E. Wilcox |
| 4,570,391 | Feb. 18, 1986 | Quante et al |
| 4,710,028 | Dec. 1, 1987 | Ziemer et al |

The Wilcox U.S. Pat. No. 3,986,850 illustrates attempts to place rows of lighting fixtures 53 between banks of filters 49. As is apparent, the rows of lighting fixtures 53 reduce the overall filtered area of the ceiling and prevent any laminar flow directly beneath the fixtures.

Similar alternate filter and light assemblies supported by a grid are illustrated in U.S. Pat. No. 4,603,618 to C. W. Soltis issued Aug. 5, 1986. In an attempt to minimize a disturbance of the laminar flow, the Soltis patent shows a diffusion panel below the filters and the lighting fixtures.

The importance of ceiling filters and the ceiling grid has been indicated above and the effective seals have bee achieved in the past employing troughs in the framework which are filled with a viscous gel and into which a depending edge of a filter assembly extends coated with the gel. An airtight seal is thereby produced between a filter panel and the supporting frame. Examples of the use of such viscous gel seals are shown in U.S. Pat. No. 3,986,850 to Wilcox, Reissue patent No. 27,701 to Cadwell, a reissue of U.S. Pat. No. 3,529,406 and perhaps the earliest disclosure of gel seals in a clean room channel suspension system appears in U.S. Pat. No. 3,486,311 to A. R. Allen Jr., issued Dec. 30, 1969.

Despite the 20 years of development of clean rooms the following objectives have yet to be achieved:

(1) Elimination of the loss of filter area due to the presence of the grid suspension system;

(2) Providing near 100% effective laminar flow area of the ceiling;

(3) Provision for minimum interference with air flow and ease of servicing auxiliary features such as lighting and sprinklers without disturbing the integrity of the filter system;

(4) Ease and simplicity of installation;

(5) Ease of removal and replacement of filter panels with assurance of restoration of ceiling filter integrity and;

(6) Effective location and operation of auxiliary services such as lighting and sprinklers without degradation of their performance by reason of the presence of the filters or the suspension system.

None of these advantages have been achieved employing prior art systems. Examples of other systems beside those described above which likewise fail to achieve these results are the following:

| U.S. Pat. No. | Issue Date | Inventor |
| --- | --- | --- |
| 4,554,766 | Nov. 26, 1985 | Ziemer et al |
| 4,549,472 | Oct. 29, 1985 | Endo et al |
| 4,671,811 | June 9, 1987 | Cadwell et al |
| 4,461,205 | July 24, 1984 | Shuler |
| 3,626,837 | Jan. 1, 1974 | Smith et al |
| 3,935,803 | Feb. 3, 1976 | L. Bush |
| 3,688,477 | Sept. 5, 1972 | C. Coward Jr. |
| 4,082,525 | April 4, 1978 | T. T. Allan |
| 4,088,463 | May 9, 1978 | I.M. Smith |

BRIEF DESCRIPTION OF THE INVENTION

Faced with the foregoing state of the art, we determined that we were able to design a gridless, suspended clean room filter system with virtually 100% ceiling filter area (except only the filter frame thickness as filter area).

We have also developed a system which employs effective gel seals in a direct filter frame to filter frame sealing relationship.

We have also developed a system which takes on the appearance of a checkerboard with the adjacent filters at different levels and the auxiliary services introduced into the clean room through the side walls of the upper filter frames. We have also developed a system in which there are two sets of frame filters with one set of framed filters supported in the plenum region outside of the clean room and the second set of filters supported by the first set of filters. In one embodiment of this invention, the first set of filters are located above the level of the second set of filters in a checkerboard array and include depending surfaces or skirts which extend into edge troughs formed into the frame of the second set of filter frames.

In an alternate embodiment of this invention, the second set of filter frames are suspended from the plenum area and the depending sides of the first set of filter frames rest in the grooves of the second set of filter frames and are supported thereby with a ceiling agent in the grooves or troughs. In accordance with one feature of this invention of either embodiment, auxiliary services are located in the checkerboard recess defined by the depending surfaces or skirts of the first set of filter frames and the auxiliary services are provided by a sealed fixture in the depending surfaces or skirts of the first set of filter frames.

In accordance with one feature of the invention, the auxiliary services may be provided at any place in the ceiling beneath the first set of filters.

BRIEF DESCRIPTION OF THE DRAWING

This invention may be more clearly understood from the following detailed description and by reference to the drawing in which:

FIG. 3 is a simplified vertical sectional view of the ceiling of FIG. 1 taken along line 1—1 of FIG. 1;

FIGS. 4a, b and c are perspective views of corner details of the first set of filters, the second set of filters and a partial assembly of a first series filter and a second series filter, respectively;

FIGS. 5, 6 and 7 are bottom plan views of fragmentary portions of different corner details in accordance with this invention;

FIG. 8 is an enlarged vertical sectional view of the seal detail of FIG. 3;

FIG. 9 is a vertical sectional view similar to FIG. 3 of an alternate embodiment of this invention; and is an enlarged fragmentary vertical section of an assembled first and second filter.

DETAILED DESCRIPTION OF THE INVENTION

Figure 1:
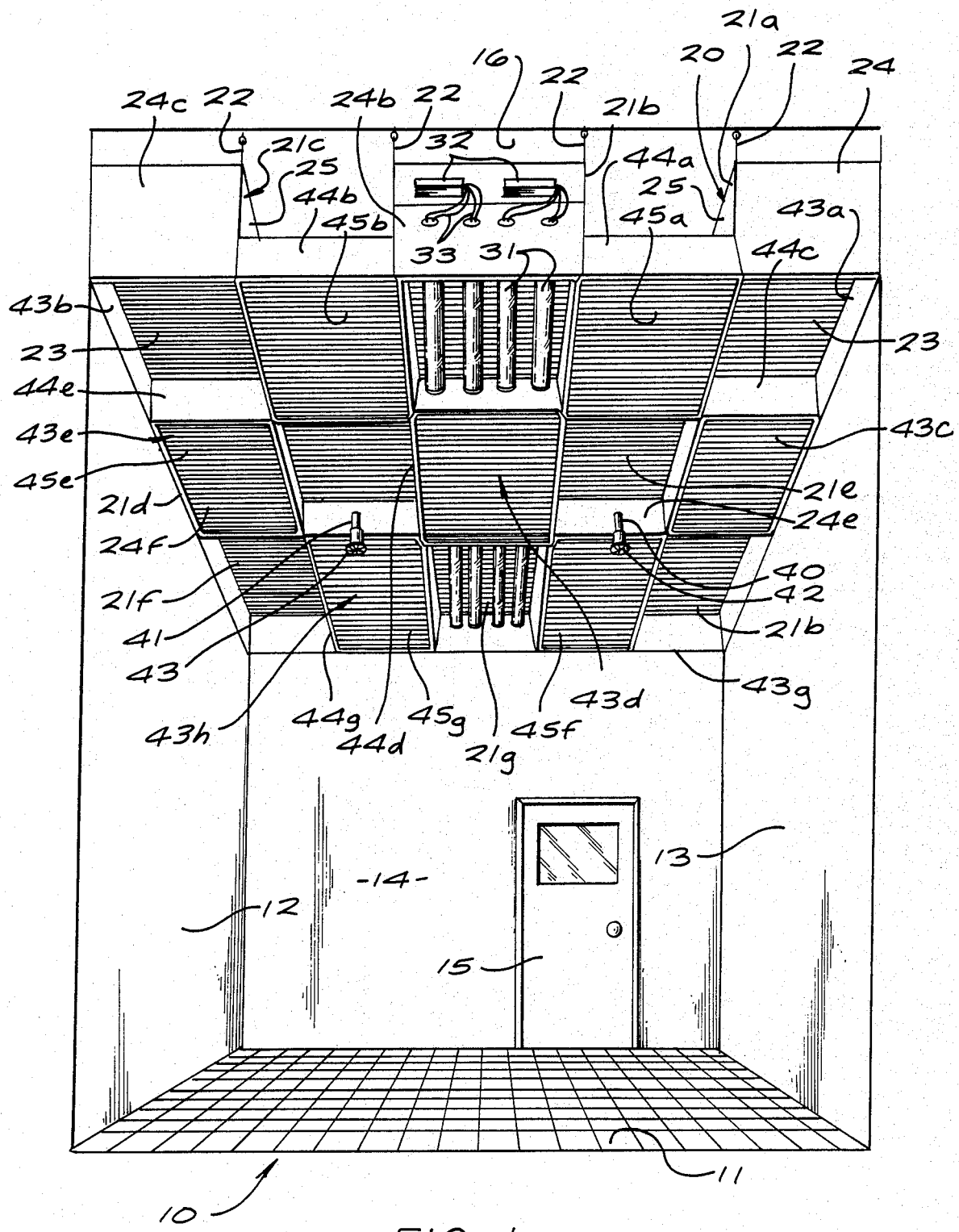
FIG. 1 is a perspective view in simplified form of a clean room absent the near wall showing a typical installation of this invention.
Figure 2:
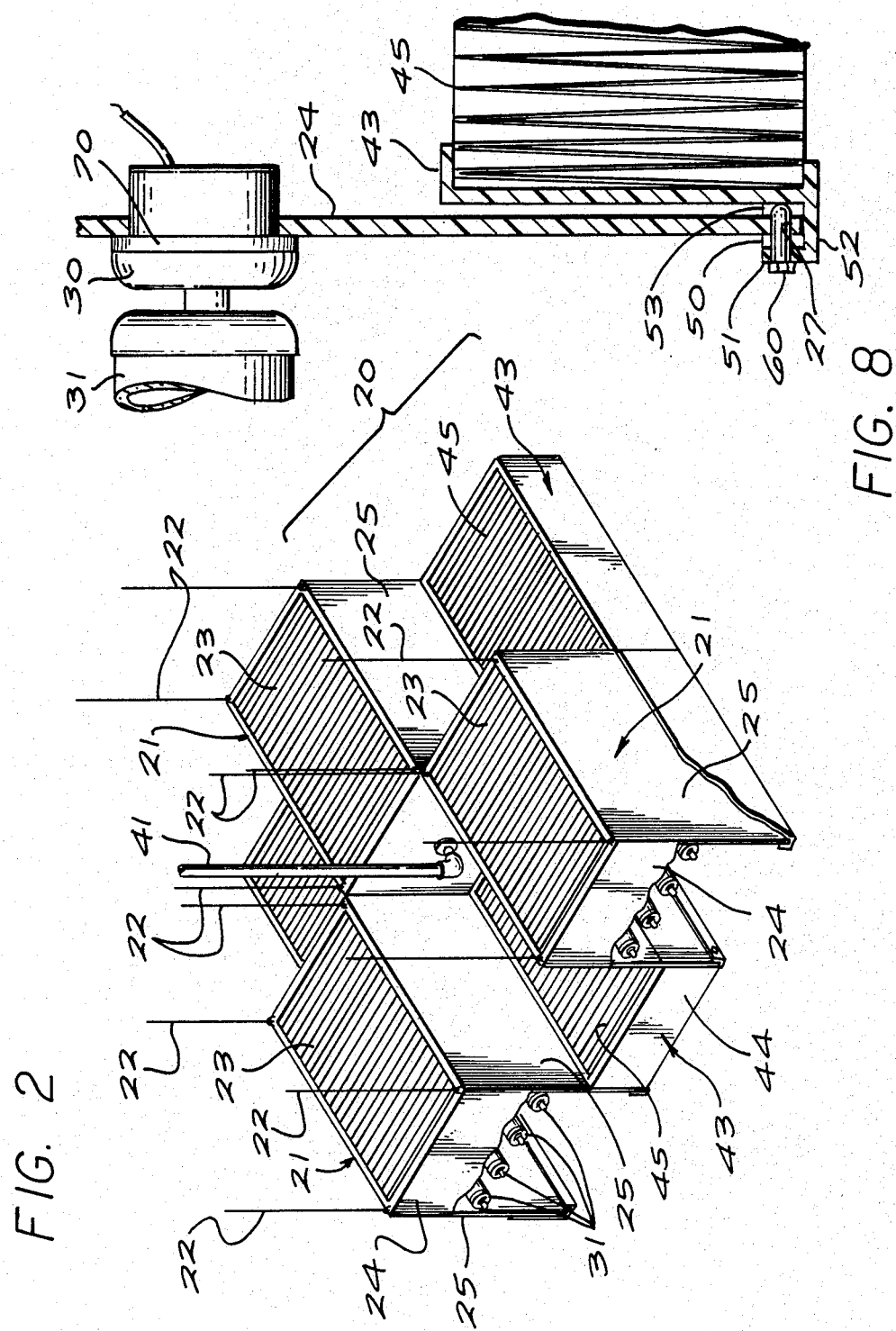
FIG. 2 is a simplified perspective view of the ceiling assembly of FIG. 1 as viewed from the plenum region above the filter ceiling.
Figures 3, 9:
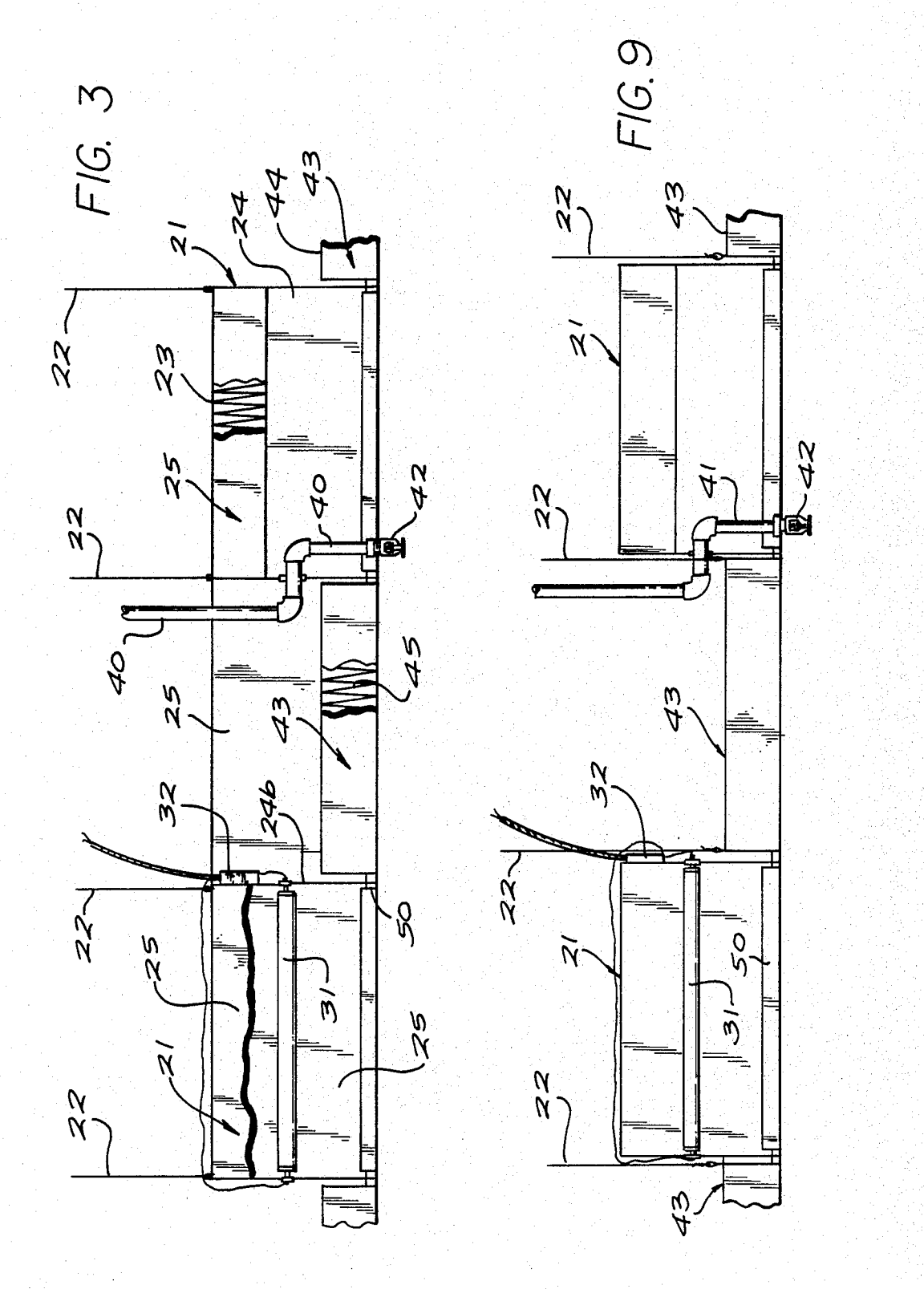

Now referring to FIG. 1 in conjunction with FIGS. 2 and 3, a clean room generally designated 10, is illustrated with the near wall removed including a floor 11, pair of side walls 12 and 13 and end wall, 14, with an access door 15, typically an airlock door, and an actual ceiling 16. Suspended below the actual ceiling 16 in the room 10 is a first filter assembly generally designated 20. The assembly is made up of an array of what is termed upper filter units 21a through 21h. Each of these upper units 21a-h are suspended by a plurality of, for example 4, guy wires 22, or support rods which in turn are secured to the ceiling 16.

The upper filter units 21a-h are preferably rectangular in shape, for example, approximately 24 inches×48 inches×9 inches, with a thin frame edge of sufficient strength to hold a "HEPA" filter element 23 to provide effective filtration of air flow between the plenum volume 17 and the clean room 10. The plenum 17 is defined by the upper surface of the entire filter assembly, the ceiling 16 and the upper extremities of walls 12, 13 and 14 and the missing front wall. The circulating path an air blowers are not illustrated but are well known in the art. Suffice it to say that a continuous laminar flow of filtered air is caused to flow from the plenum 17 to the clean room 10.

In a typical application, the HEPA filters 23, have a depth of approximately 3 inches and the depending peripheral skirt is approximately 6 inches in depth. The upper filter assemblies 21a-h have an air tight rectangular vertical wall, generally designated end wall 24 and side walls 25. The near most end walls 24 of the upper filter units 21a, b an c are fairly visible at the top of FIG. 1. Typically, the end and side walls 24 and 25 of each of the upper filter units 21a–h each define a closed side and end rectangle in sealed relationship with the HEPA filter 23 contained therein but have an excess depth below, the filter 23 greater than the depth of the filter, e.g. an additional 6 inches.

Although the side walls 25 of the upper filter units 21a-h are not only air tight but without openings therein, the end walls 24 of certain of the upper filter assemblies include openings at least for mounting screws and electrical wires for a plurality of light fixtures 30 such as fluorescent lamp mounts which hold fluorescent lamps 31. The outer face 24b includes mounting holes and electrical lead wires for the fixtures and provide mounts for electrical ballast 32. The feed tube of the wires 33 are sealed to prevent airflow through the openings. The lamps 31 are fully exposed to clean room 10.

Similarly, upper units 21d and 21e have fixtures, in this case sprinkler piping 40 and 41 respectively, extending through the end wall 24e and 24f which through an elbow, support sprinkler heads 42 and 43 in the clean room below the HEPA filters.

It is clear from FIG. 1 that the upper filter members 21 alternate with an additional set of filter assemblies, namely 43a–h. These lower filter assemblies 43a-h comprise frame members 44a-g in sealed relationship with its respective lower HEPA filter 45a-g.

The operative relationship between the first set of filters 21 and the second set 43 is illustrated particularly in FIGS. 3, 4 and 8. In these figures, it may be clearly seen that the lower filters 43 each are surrounded by an open top channel 50 defined by an outer lip 51 and a flat bottom 52. The channel 50 is filled with a viscous gel produced by the Dow Corning Company in accordance with the teaching of the Allen U.S. Pat. No. 3,486,311 and succeeding patents. We have found that of the various gels available, two part SILASTIC SILICONE GEL produced by the Dow Corning Company is effective in our invention.

The lower edges 27 of the depending skirt walls 24 and 25 of the filter units 21, as shown in FIGS. 3, 4 and 8, rest on the bottom 52 of the groove 50. The gel 53, as best seen in FIG. 8, fills the groove 50 and provides an effective air tight seal between the frames 21 and all adjacent frames 43. Frames 21 located away from the walls engage four adjacent frames 43. Side wall frames 21 engage three frames 43 and corner frames 21 engage two frames 43. The frames 43 and their filter 45 are supported from the depending walls or skirts 24 or 25 by any of various means, however we have found that pins 60, as seen in FIG. 8, extending through mating openings in the lip 51 and the bottom of the skirt 25 provide effective support for the lower filter members 43. We have found that four or six pins 60 provide adequate support for each lower filter 43, two or three on each side.

It should also be noted that the intersections of the adjoining lower filters with their lips 51 must engage to provide a continuous trough without leakage of the gel at corners. First, the skirt 24-25 is continuous so there is no leakage through its body but the grooves or troughs 50 must provide a continuous gel seal. A 45 degree chamfer visible in FIG. 4b as well as in FIG. 5 provides a close fitting joint which will hold the viscous gel without leakage. Other joint forms including four symetrical pointed groove bottoms are shown in FIG. 6 while totally closed corner joints are illustrated in FIG. 7.

The nature of the mounting of fluorescent fixtures is best seen in FIG. 8 where the detail of a built-in socket 30 may be seen supporting a single fluorescent lamp 31. A gasket 70 lies between the socket 30 and the wall 24. The gasket 70 insures an air tight seal. Similar gaskets are located around each feed through of sprinkler piping 40 of FIGS. 2, 3 and 9. It should also be noted in connection with FIG. 3, that ballast 32 and piping 40 are located in the plenum area above the lower filters and provide minimum interference with laminar flow and do not reduce the actual filter cross sectional area. The only interference provided by the lighting fixtures and sprinklers is disturbance of flow around the piping 40, fixture 42 and the lamps 31.

Now referring to FIG. 9, an alternate embodiment of this invention may be seen therein in which the lower filters 43 are supported by cables or rods 22 and the upper filters are supported by their skirt portions resting in the grooves 50. This embodiment eliminates the need for the pins 60 of FIG. 8 but does not provide as simple removal of the lower filters for service of the ceiling. In the embodiment of FIG. 9, access to the plenum area through the ceiling is obtained by lifting an upper filter 21 which does not include any services such as lamp 31 or sprinkler 42. For simplicity of installation and service the embodiment of FIGS. 1 and 3 is preferred.

This invention shall not be limited to the illustrative embodiments but rather to the claims as set forth below which constitute definitions of this invention including the protection afforded by the doctrine of equivalents.

What is claimed is:

1. A multiplane modular ceiling system for clean rooms comprising a first set of first framed filters, each including a generally planar filter medium and a peripheral frame enclosing and mounting a respective filter medium in a horizontal plane for air flow from the upper side of the filter medium to the lower side of the filter medium, with the upper side of the filter medium exposed to an air supply plenum above said framed filters and the lower side of the framed filters exposed to a space to be maintained as a clean room;
    said first framed filters being of regular shape and each peripheral frame including depending substantially air tight walls extending below the lower surface of said filter medium;
    a second set of framed filters, each including a generally planar filter medium and a peripheral frame enclosing and mounting a second respective filter medium with an upper surface of said filter medium exposed to the air supply in said plenum and the lower surface of said filter medium exposed to the space to be maintained as a clean room;
    said second set of framed filters defining an edge trough open at the top with lengths corresponding to the lengths of the lower edge of the first frame depending substantially air tight walls;
    seal means within said troughs;
    the first set of framed filters having the lower edges thereof resting in respective troughs in sealed relationship with said second set of troughs;
    means securing said first set of framed filters to said second set of framed filters in supporting relationship therewith; and
    means for supporting said framed filters from the plenum side of said framed filters.

2. The combination in accordance with claim 1 wherein said first and second framed filters are arranged in an alternating checkerboard array.

3. The combination in accordance with claim 1 wherein the depending walls of said first peripheral frames are of sufficient length to receive lighting fixtures therein with at least a portion of said lighting fixtures located in the region below the filter media supported by said first peripheral frame and above the lower surface of said second peripheral frames.

4. The combination in accordance with claim 3 wherein said lighting fixtures extend in sealed relationship through at least one of said depending walls of one of said first peripheral frames.

5. The combination in accordance with claim 4 wherein said lighting fixtures are of fluorescent type and including socket means in sealed relationship with the depending portion of opposite walls of said first peripheral frames and wherein said lighting fixture includes a fluorescent lamp located totally within the space between opposing walls of said first peripheral frames below the first filter supported by said first peripheral frames.

6. The combination in accordance with claim 1 wherein said means for supporting said first and second framed filters comprise support means engaging said first peripheral frames and means securing the trough portion of said second set of framed filters within said seal means to the depending wall of said first set of framed filters.

7. The combination in accordance with claim 6 wherein said sealing means comprises a viscous gel partially filling said trough and said fastening means comprises a pin extending partially through said trough and through an opening in the depending wall of said first peripheral frame whereby support for said second peripheral frame is achieved and the sealing integrity of said gel seal is maintained.

8. A framed filter assembly for use in a clean room comprising a rectangular frame having a depth sufficient to hold a filter medium positioned to allow flow of air from one side of said filter medium to the opposite side of said filter medium;
    a filter medium extending across said rectangular frame in sealed relationship therewith
    an exterior peripheral trough defined by said rectangular frame;
    the outer wall of said frame defining said trough including a plurality of openings there through for receiving locking means;
    a plurality of locking means dimensioned for sealing fit insertion into said openings and for extension at least part way through said trough;
    the portion of said frame defining the top of said trough being sufficiently above the level of said openings whereby said trough may be filled with a viscous seal to a level above said locking means to provide an effective peripheral seal for said filter assembly.

9. A filter assembly for clean rooms comprising a rectangular frame dimensioned to hold a rectangular generally planar filter medium with the upper surface thereof exposable to a plenum and a lower surface exposable to a clean room;
    a generally planar filter medium positioned within said rectangular frame;

said frame including depending wall surfaces extending below the level of the lower surface of said filter medium and defining a rectangular wall edge;

said depending wall surfaces being dimensioned whereby a lighting fixture may be located in the region below the lower surface of said filter medium and above the lower edge of said depending walls.

10. The combination in accordance with claim 9 including lighting fixture socket means in sealed relationship with said depending wall portions.

11. A filter system comprising;

a first set of generally planar framed filter media;

a second set of generally planar framed filter media;

means supporting one of the sets of generally planar framed filter media by the frame portion thereof spaced from a surface;

said one set of generally planar framed filter media supporting the other of said sets of filter media by the frame portions thereof to define a filter array.

12. A filter system in accordance with claim 11 wherein said first set of framed media includes a peripheral depending skirt presenting an edge below the filter medium portion of said first set of framed filter media;

said second set of framed filter media including outward extending support portions;

the skirt portions of said first set of framed filter media receiving support from the outward extending support portions of said second set of framed filter media.

* * * * *